United States Patent
Rybicki et al.

(10) Patent No.: US 8,355,715 B2
(45) Date of Patent: Jan. 15, 2013

(54) CLIENT MODULE, MULTIMEDIA SERVER AND METHODS FOR USE THEREWITH

(75) Inventors: Mathew A. Rybicki, Austin, TX (US); Suiwu Dong, Markham (CA); James Ward Girardeau, Jr., Austin, TX (US); Paul Morris Astrachan, Austin, TX (US); Michael M. Chen, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1090 days.

(21) Appl. No.: 11/408,619

(22) Filed: Apr. 21, 2006

(65) Prior Publication Data

US 2007/0249307 A1 Oct. 25, 2007

(51) Int. Cl.
*H04W 4/00* (2009.01)

(52) U.S. Cl. ........ 455/434; 455/450; 455/509; 455/513; 455/62; 455/137; 375/256; 375/267; 375/298; 375/299; 375/346; 375/347; 375/348; 375/349

(58) Field of Classification Search ............... 455/552.1, 455/553.1, 561, 132, 137, 273, 277.1, 161.1, 455/161.2, 161.3, 3.01
See application file for complete search history.

(56) References Cited

U.S. PATENT DOCUMENTS

| | | | | |
|---|---|---|---|---|
| 5,457,816 A * | 10/1995 | Koyama | ..................... | 455/161.2 |
| 5,699,125 A * | 12/1997 | Rzeszewski et al. | ............ | 725/54 |
| 6,067,290 A * | 5/2000 | Paulraj et al. | ................. | 370/329 |
| 6,212,680 B1 * | 4/2001 | Tsinberg et al. | ................ | 725/39 |
| 6,643,522 B1 * | 11/2003 | Young | ........................ | 455/552.1 |
| 7,054,644 B2 * | 5/2006 | Heubel | ......................... | 455/454 |
| 7,155,196 B1 * | 12/2006 | Beard | .............................. | 455/339 |
| 7,400,888 B2 * | 7/2008 | Smith et al. | .................... | 455/450 |
| 7,489,899 B2 * | 2/2009 | Kobayashi et al. | .......... | 455/3.01 |
| 7,499,462 B2 * | 3/2009 | MacMullan et al. | .......... | 370/401 |
| 7,630,696 B2 * | 12/2009 | Loyet | ......................... | 455/426.1 |
| 7,639,991 B2 * | 12/2009 | Kim et al. | .................. | 455/277.1 |
| 7,865,155 B1 * | 1/2011 | Smith | .......................... | 455/137 |
| 2002/0039884 A1 * | 4/2002 | Raynes et al. | ................ | 455/453 |
| 2002/0137472 A1 * | 9/2002 | Quinn et al. | .................. | 455/132 |
| 2003/0008623 A1 * | 1/2003 | Uesugi | ............................ | 455/70 |
| 2003/0060219 A1 * | 3/2003 | Parsiokas | ...................... | 455/501 |

(Continued)

FOREIGN PATENT DOCUMENTS

JP 2005210648 A 8/2005

(Continued)

OTHER PUBLICATIONS

Office Action, JP Patent Application No. 2007-112692, Oct. 27, 2011, 7 pages.

(Continued)

*Primary Examiner* — Brian Pendleton
*Assistant Examiner* — Dika C. Okeke
(74) *Attorney, Agent, or Firm* — Garlick & Markison; Bruce E. Stuckman

(57) ABSTRACT

An encoded signal is modulated to produce a first radio frequency (RF) signal that is transmitted to a client module over a first transceiver channel when a first transceiver module is in a transceive mode. A channel scan is performed when the first transceiver module is in a scan mode. The encoded signal is modulated to produce a second RF signal and that is transmitted over a second transceiver channel when a second transceiver module is in a transceive mode.

29 Claims, 19 Drawing Sheets

U.S. PATENT DOCUMENTS

| | | | |
|---|---|---|---|
| 2003/0231655 A1 | 12/2003 | Kelton | |
| 2004/0038716 A1* | 2/2004 | Gass | 455/569.1 |
| 2005/0075077 A1* | 4/2005 | Mach et al. | 455/67.13 |
| 2005/0153667 A1* | 7/2005 | Cave et al. | 455/90.3 |
| 2005/0190782 A1* | 9/2005 | Buckley et al. | 370/437 |
| 2006/0073797 A1* | 4/2006 | Kent et al. | 455/132 |
| 2006/0153389 A1* | 7/2006 | Temerinac et al. | 381/2 |
| 2007/0002961 A1* | 1/2007 | Hoctor et al. | 375/267 |
| 2007/0047659 A1* | 3/2007 | Aleksic | 375/240.25 |

FOREIGN PATENT DOCUMENTS

| | | |
|---|---|---|
| JP | 2005530416 A | 10/2005 |
| JP | 2006109074 A | 4/2006 |
| JP | 2006253074 A | 9/2006 |

OTHER PUBLICATIONS

Office Action, JP Patent Application No. 2007-112692, May 31, 2012, 6 pages.

* cited by examiner

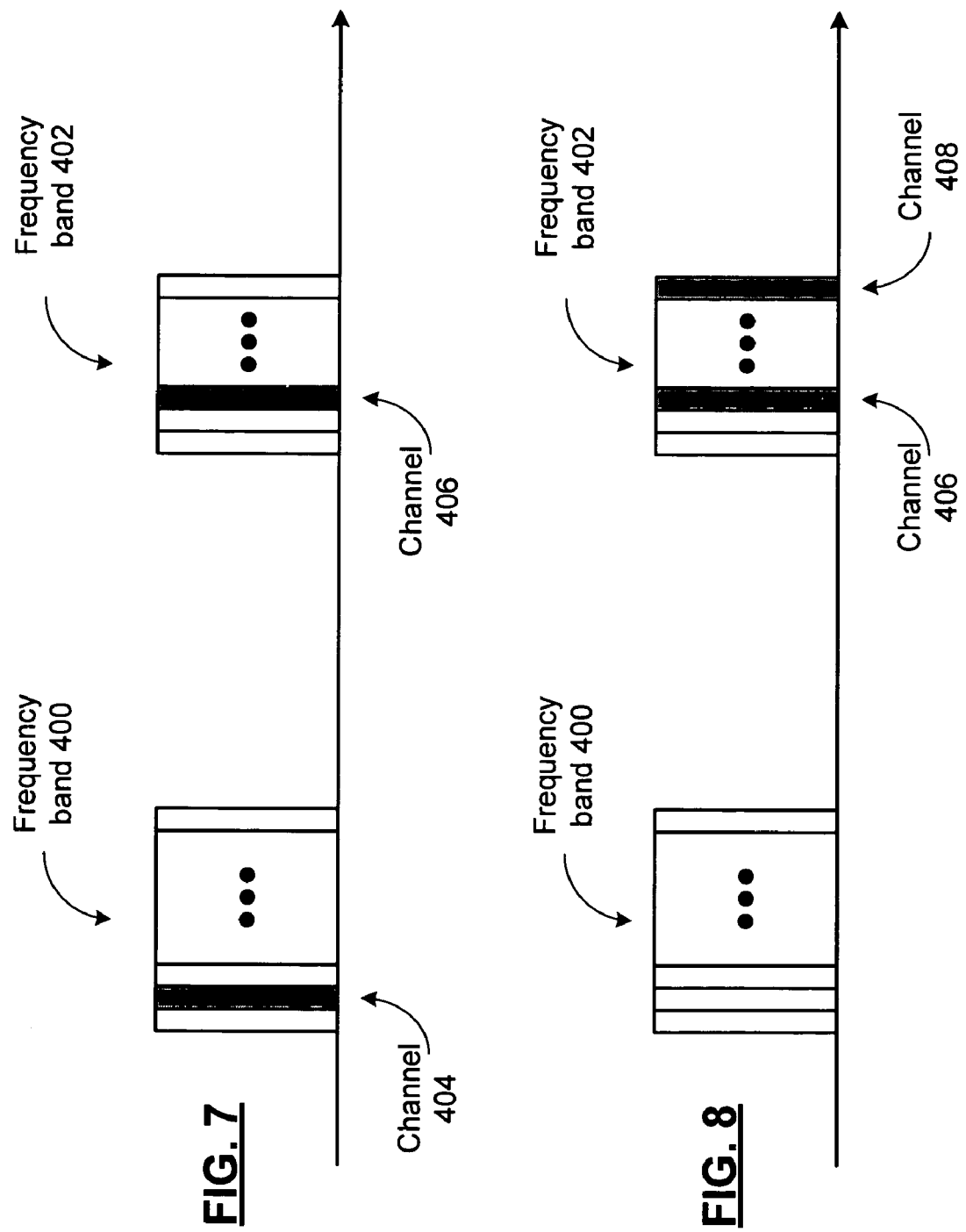

CLIENT MODULE, MULTIMEDIA SERVER AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services. As such, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

In such wireless communication systems, the data is transmitted via radio frequencies (RF) in accordance with one or more data transmission protocols. In any type of wireless communication system, the reception of transmitted information can be susceptible to fading, interference and noise over the communication channel that degrades the quality of the received information, decreases the transmission rate or otherwise lowers the performance of the communication channel. Therefore, a need exists for a method and apparatus for a communication system to overcome the above-mentioned issues in a manner that can efficiently be implemented.

BRIEF DESCRIPTION OF THE DRAWINGS

FIG. 7 presents a graphical representation of a frequency spectrum in accordance with an embodiment of the present invention.

FIG. 8 presents a graphical representation of a frequency spectrum in accordance with an embodiment of the present invention.

DETAILED DISCUSSION OF A PREFERRED EMBODIMENT

Figure 1:
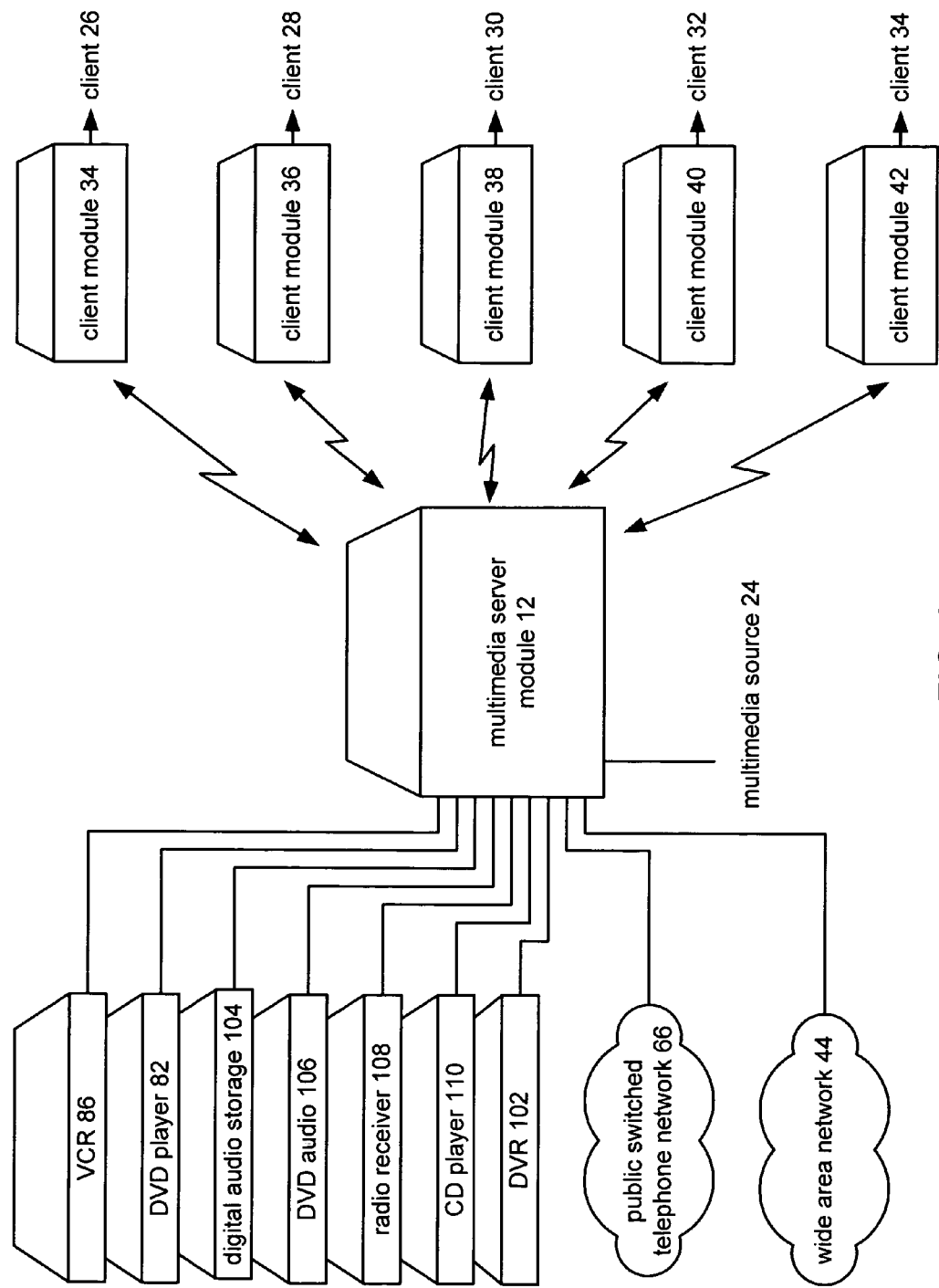
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server 12 in processing the request. As such, one client may be accessing the Internet, while another client is watching a satellite broadcast channel, while another is listening to a CD playback, while another is talking on the telephone, and yet another is watching a DVD playback. This is all done via the multimedia server 12 without requiring the clients to have direct access to the multimedia sources and without the requirement that each client have its own multimedia source and/or multimedia source connection.

The multimedia server 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 3-11.

Figure 2:
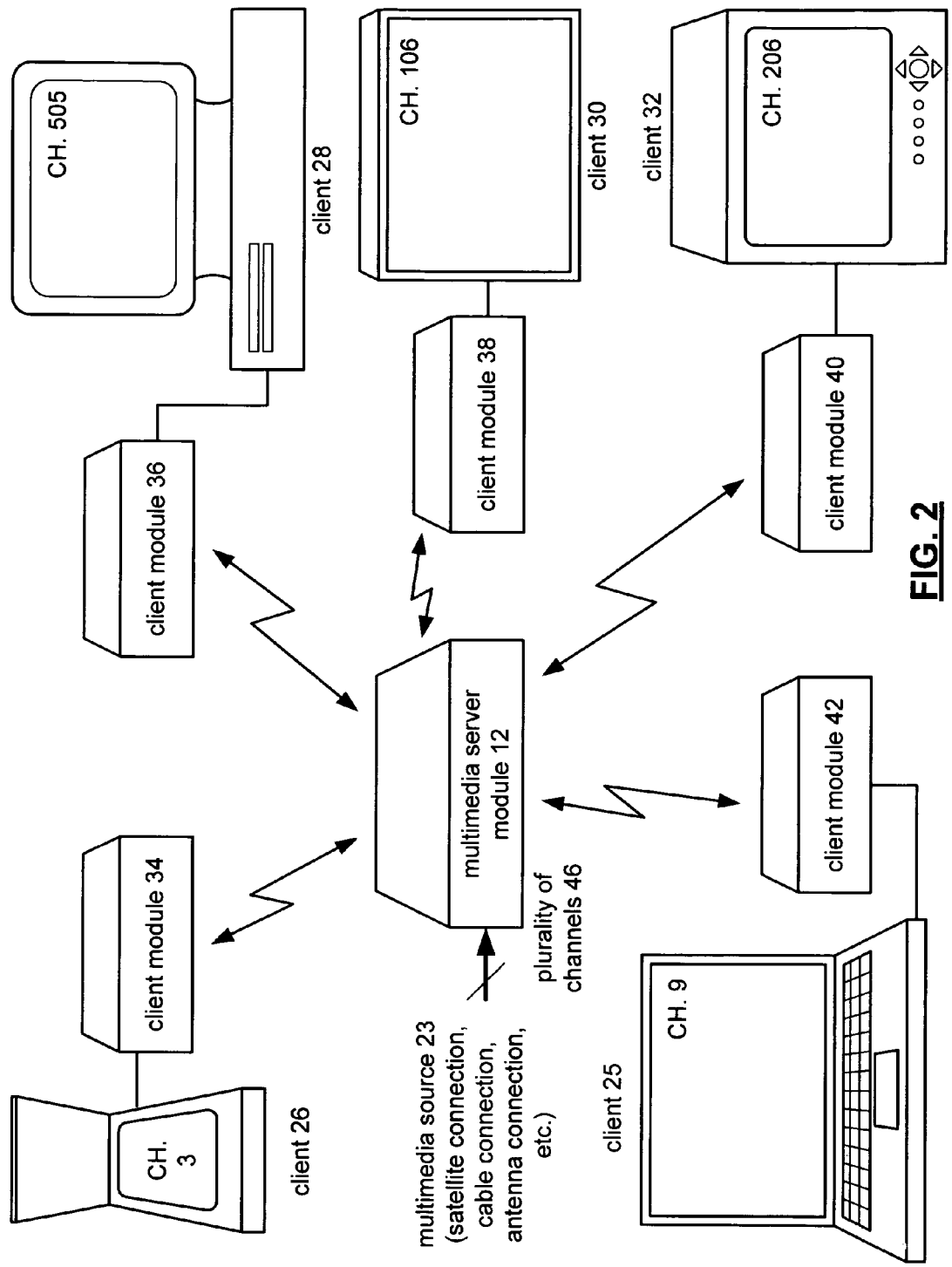
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server 12, a plurality of client modules 34, 36, 38, 40 and 42 that are operably coupled to a plurality of clients 25, 26, 28, 30, and 32. The multimedia server 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server 12 may be a stand-alone device, may be incorporated in a satellite receiver, set-top box, cable box, HDTV tuner, home entertainment receiver, et cetera. In addition, the multimedia server 12 may be implemented using discrete components, integrated circuits, and/or a combination thereof.

The multimedia server 12 communicates with the plurality of client modules 34, 36, 38, 40, and 42 via a radio frequency communication path. As such, the multimedia server 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server 12. The multimedia server 12 selects channel 3 from the plurality of channels 46. The data corresponding to channel 3 is then time multiplexed with the data for the other channels and transmitted from the multimedia server 12 to each of the client modules 34, 36, 38, 40 and 42. Client module 34 monitors the transmission from the multimedia server 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server 12. Multimedia server 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
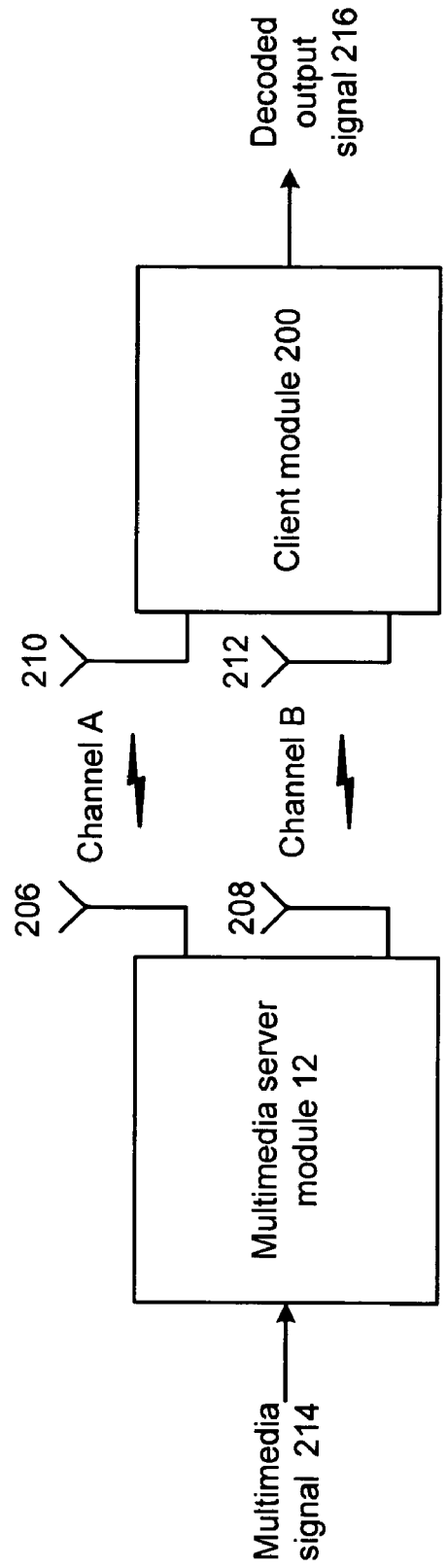
FIG. 3 presents a block diagram representation of a multimedia client/server system in accordance with an embodiment of the present invention.

FIG. 3 presents a block diagram representation of a multimedia client/server system in accordance with an embodiment of the present invention. In particular, the multimedia client/server system includes multimedia server 12 that transmits a multimedia signal 214, such as a broadcast, stored or streaming signal from multimedia source 23. Multimedia server module 12 transmits, via antennas 206 and 208, two radio frequency (RF) signals that contain duplicate copies of the multimedia content from multimedia signal 214. These two RF signals are transmitted at two carrier frequencies corresponding to channel A and channel B of an RF spectrum. Client module 200, (such as client modules 34, 36, 38, 40 and 42) receives these two RF signals via antennas 210 and 212 and produces a decoded output signal 216.

It should be noted that channel A and channel B represent different channels of an RF spectrum corresponding to different carrier frequencies. This is as opposed to channels 3, 9, 106, 206 and 505 discussed in association with FIG. 2 where "channel", is this context, was used primarily to denote difference streams of multimedia content such as "The Weather Channel", "The Discovery Channel" or "Gone with the Wind". The transmission of duplicate content over two carrier frequencies provides frequency diversity to the transmission. A recombination scheme can be utilized in the client module 200 to reconstruct the multimedia signal 214 in the presence of noise, interference and fading in both channels, providing a more reliable transmission between multimedia server module 12 and client module 200. In the event that noise, interference or fading hamper the performance of one of the channels, the content can still be recovered over the remaining channel.

Figure 4:
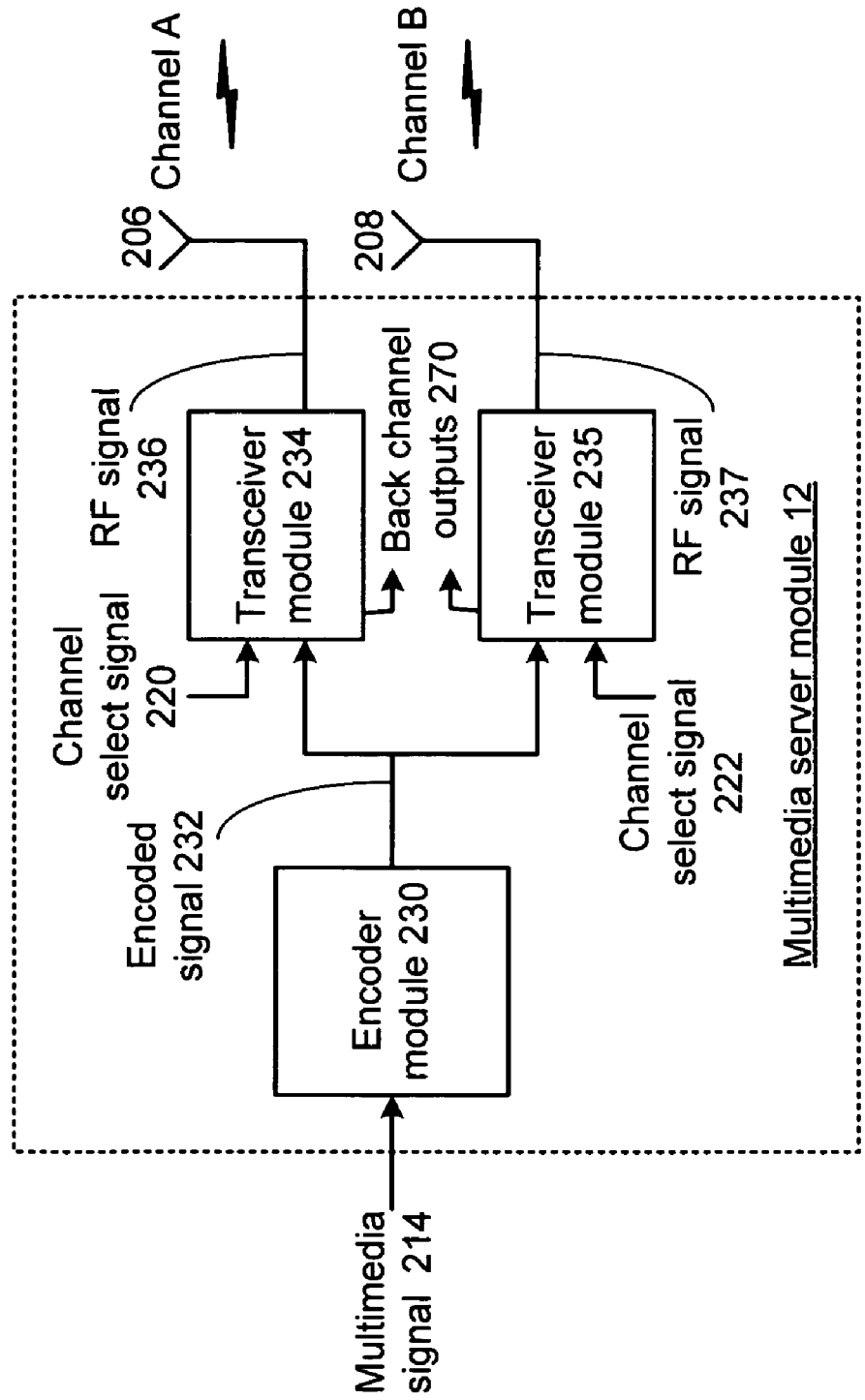
FIG. 4 presents a block diagram representation of a multimedia server module in accordance with an embodiment of the present invention.
Figure 5:
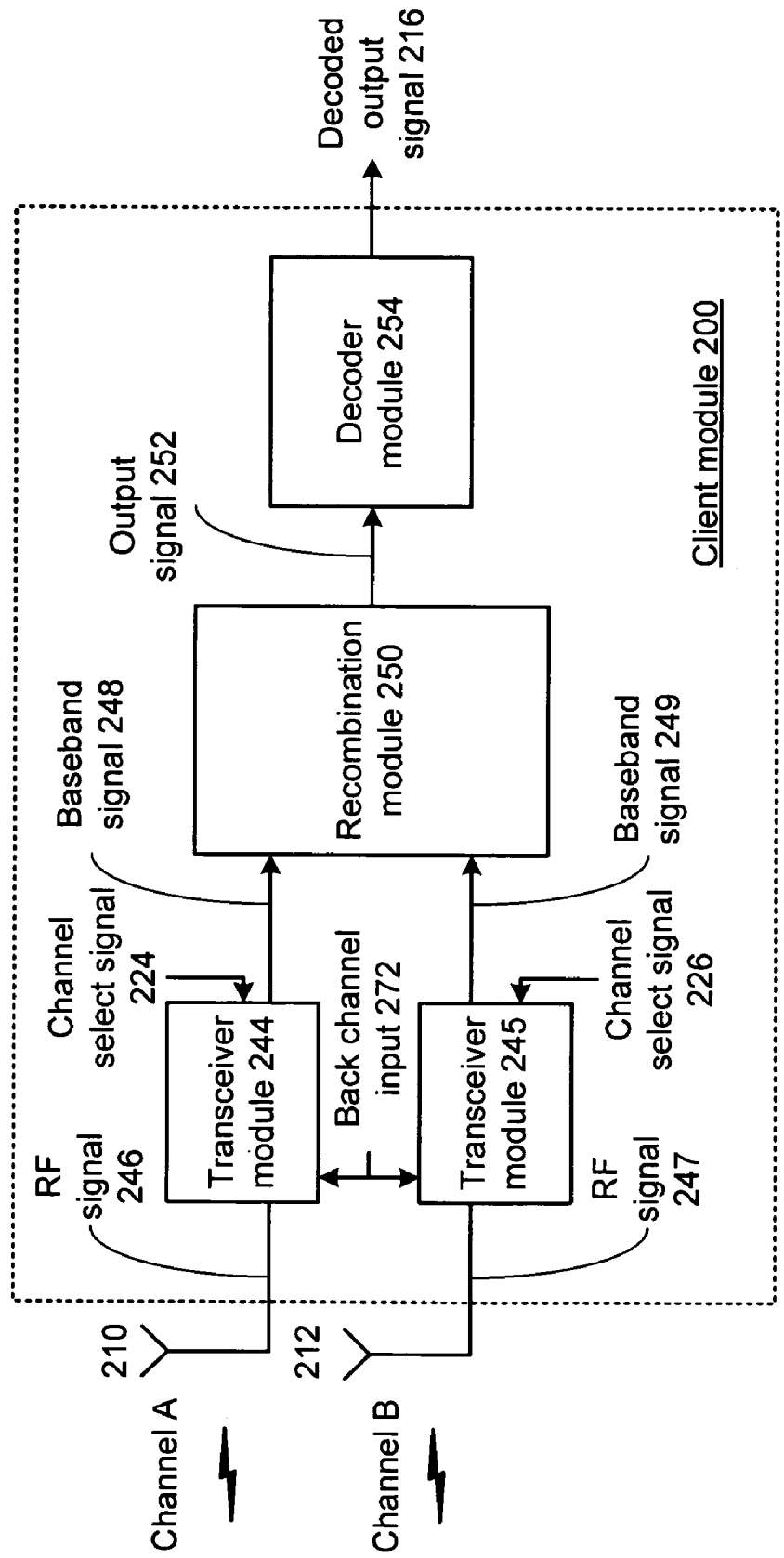
FIG. 5 presents a block diagram representation of a client module in accordance with an embodiment of the present invention.

Further functions and features of the multimedia server module 12 and client module 200 are presented in conjunction with FIGS. 4 and 5.

FIG. 4 presents a block diagram representation of a multimedia server module in accordance with an embodiment of the present invention. In particular, multimedia server module 12 includes an encoder module 230 for producing an encoded signal 232 from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channels A and channel B. In an embodiment, the multimedia signal 214 includes an analog composite video signals that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

Multimedia server module 12 further includes transceiver module 234 for modulating the encoded signal 232 to produce a RF signal 236 at a first carrier frequency and for transmitting the first RF signal 236 over channel A using antenna 206. Transceiver module 235 modulates the encoded signal 232 to produce RF signal 237 at a second carrier frequency and transmits the RF signal 237 over channel B using antenna 208. In addition, transceiver modules 234 and 235 produce back channel outputs 270 based on RF signals received from the client module 200 over channels A and B. In an embodiment of the present invention, the back channel outputs can be recombined in similar fashion to the recombination that will be described in conjunction with client module 200 for the forward transmission path.

In an embodiment of the present invention, transceiver modules 234 and 235 are selectively tunable to a plurality of other carrier frequencies in response to channel selection signals 220 and 222. For instance, in an implementation of the multimedia server module 12 and client module 200 using wireless transmission link in the United States that conforms with the IEEE 802.11g standard, channels A and B can be selected as any two of the 11 allocated channels. In an embodiment of the present invention, the channel selection signals can be preprogrammed into multimedia server module 12, dynamically chosen based on a site survey that scans the available channels to determine two suitable channels for use, received from the client module 200 or arbitrated between the client module 200 and multimedia server module 12, or selected under user control.

In an embodiment of the present invention, antenna 206 is placed a distance apart from antenna 208 so as to be spatially diverse. In an embodiment of the present invention, the spacing is substantially $\geq \frac{1}{4}$ wavelength of the corresponding carrier frequency. However, other spacings may likewise be implemented as will be apparent to one skilled in the art when presented the disclosure herein.

FIG. 5 presents a block diagram representation of a client module 200 in accordance with an embodiment of the present invention. In particular, client module 200 includes transceiver module 244 for receiving RF signal 246 at a first carrier frequency from multimedia server module 12 and for converting the RF signal 246 into a baseband signal 248. Transceiver module 245 receives RF signal 247 at a second carrier frequency from a multimedia server module 12 and converts RF signal 247 into a baseband signal 249. The frequency diversity scheme is accomplished by recombination module 250 that combines the baseband signal 248 and baseband signal 249 into output signal 252. Duplicate copies of the multimedia content are received, aligned and combined in such a fashion to compensate for data that is missing or corrupted from one or the other of the received signals. In addition, transceiver modules 244 and 245 are operable to modulate back channel input 272 to produce RF signals sent to multimedia server module 12 over channels A and B.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. In an embodiment of the present invention, recombination module 250 utilizes a maximum ratio recombination on a subcarrier basis for each of the 48 data-bearing subcarriers of the channel to combine the baseband signals 248 and 249 into a single output signal 252. However, other recombination schemes may likewise be implemented including phase alignment of the baseband signals and summation, or choosing the signal with the maximum received signal strength or with the highest signal to noise ratio, etc. This recombination compensates for the many of the effects of fading, interference (including multipath interference), and noise. Baseband signals 248 and 249 may also be low intermediate frequency (IF) signals.

In an embodiment of the present invention recombination module 250 formats output signal 252 in a data format such as Universal Serial Bus (USB), Personal Computer Interface (PCI), Firewire, or small computer service interface (SCSI), however, other data formats, either standard or proprietary may likewise be implemented within the broad scope of the present invention.

Client module 200 further includes decoder module 254 for decoding the output signal 252 into a decoded output signal, such as in a format used by the attached client. In particular, further decoding of the data can include decompression of a compressed digital signal, formatting of a video signal as in NTSC, PAL, SECAM, etc., and other formatting to match the input format of the client device.

In an embodiment of the present invention, transceiver modules 244 and 245 are selectively tunable to a plurality of other carrier frequencies in response to channel selection signals 224 and 226. For instance, in an implementation of the multimedia server module 12 and client module 200 using wireless transmission link in the United States that conforms with the IEEE 802.11g standard, channels A and B can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

In an embodiment of the present invention, antenna 210 placed a distance apart from antenna 212 so as to be is spatially diverse. In an embodiment of the present invention, the spacing is greater than or equal to substantially ¼ wavelength of the corresponding carrier frequency. However, other spacings may be likewise be implemented as will be apparent to one skilled in the art when presented the disclosure herein.

Figure 6:
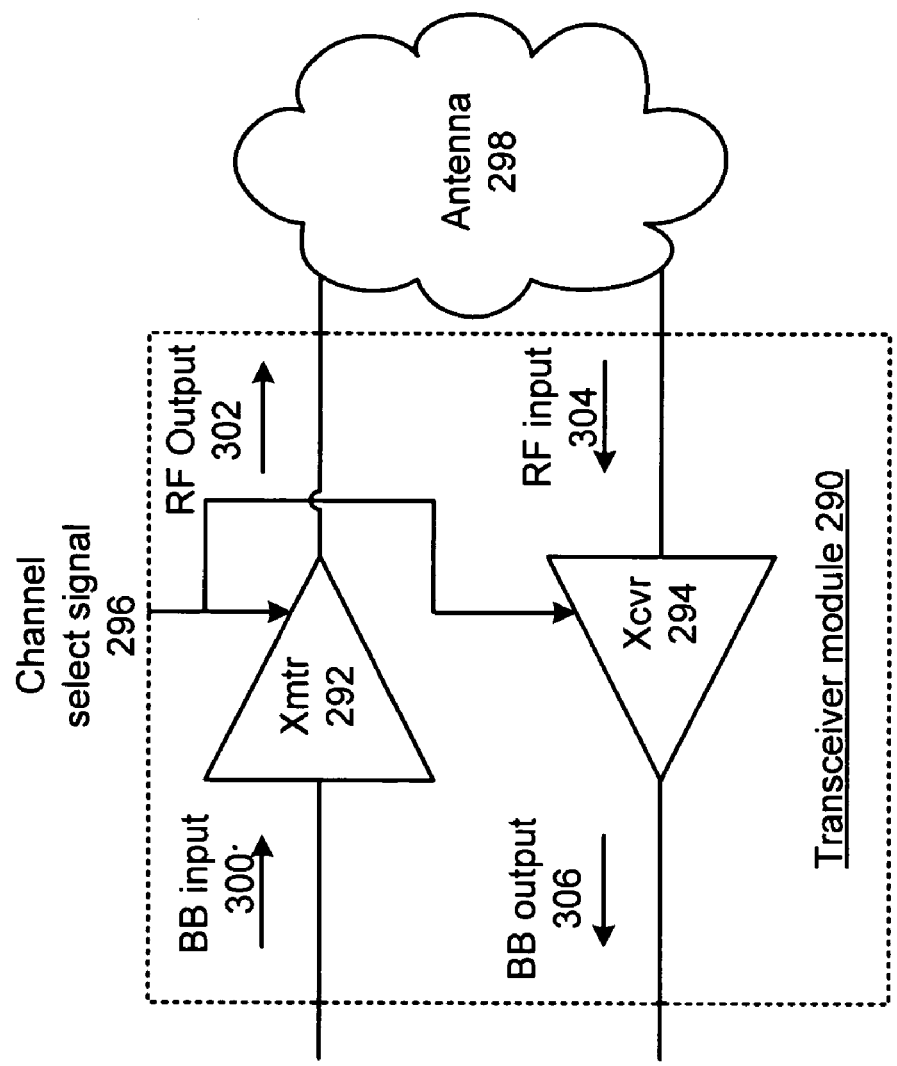
FIG. 6 presents a schematic block diagram representation of a transceiver module in accordance with an embodiment of the present invention.

FIG. 6 presents a schematic block diagram representation of a transceiver module in accordance with an embodiment of the present invention. While the communication between multimedia server module 12 and client module 200 is described primarily in terms of the forward transmission of multimedia content from the multimedia server module 12 to the client module 200, in an embodiment of the present invention, a reciprocal back channel is also present that allows for the flow of control and signaling data, channel selections (including the selections of the channel frequencies of channels A and B and the selection of the content of multimedia signal 214) as well as the flow of other user data such as an Internet uplink, transmitted telephony signals, etc. Transceiver module 290, such as transceivers 234, 235, 244 and/or 245, includes a transmitter 292 for modulating a baseband (BB) input 300 by a carrier frequency derived from channel selection signal 296, such as channel selection signals 220, 222, 224 and 226, to form an RF output 302. In addition, receiver 294 receives an RF input 304 that is demodulated, based on a carrier frequency derived from channel selection signal 296. Baseband input 300 and baseband output 306 may also be low IF signals.

In an embodiment of the present invention, antenna 298, such as antennas 206, 208, 210 and 212, includes a dedicated antenna element for transmitter 292 and receiver 294. In other embodiments however, a single antenna element can be coupled so as to be shared by both transmit and receive paths.

FIGS. 7 and 8 present graphical representations of a frequency spectrum in accordance with an embodiment of the present invention. In an embodiment of the present invention, channel A and channel B are implemented using any two channels of the available spectrum such as the Institute of Electrical and Electronics Engineers (IEEE) 802.11x compliant wireless link in either the 2.4 gigahertz (GHz) frequency band or the 5 GHz frequency band. As used herein 802.11x refers to a system conforming to any of the IEEE 802.11 family of specifications. In FIG. 7, the channels 404 and 406 that are used, such as channel A and channel B, have corresponding carrier frequencies that fall within separate frequency bands 400 and 402. In an embodiment of the present invention, the frequency band 400 corresponds to the 2.4 GHz frequency band and the frequency band 402 corresponds to a 5 GHz frequency band. This diversity between frequency bands potentially increases the diversity between channels 404 and 406 and potentially increases the quality of the recombined output signal 252. In an alternative embodiment of the present invention shown in FIG. 8, channel 406 and channel 408 are chosen from different portions of a single frequency band such as, respectively, the upper half and lower half of the frequency band 402. In general, the further the spacing between the carrier frequencies of channels A and B, the lesser the possibility that a single source of interference could be present on both channels.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 9:
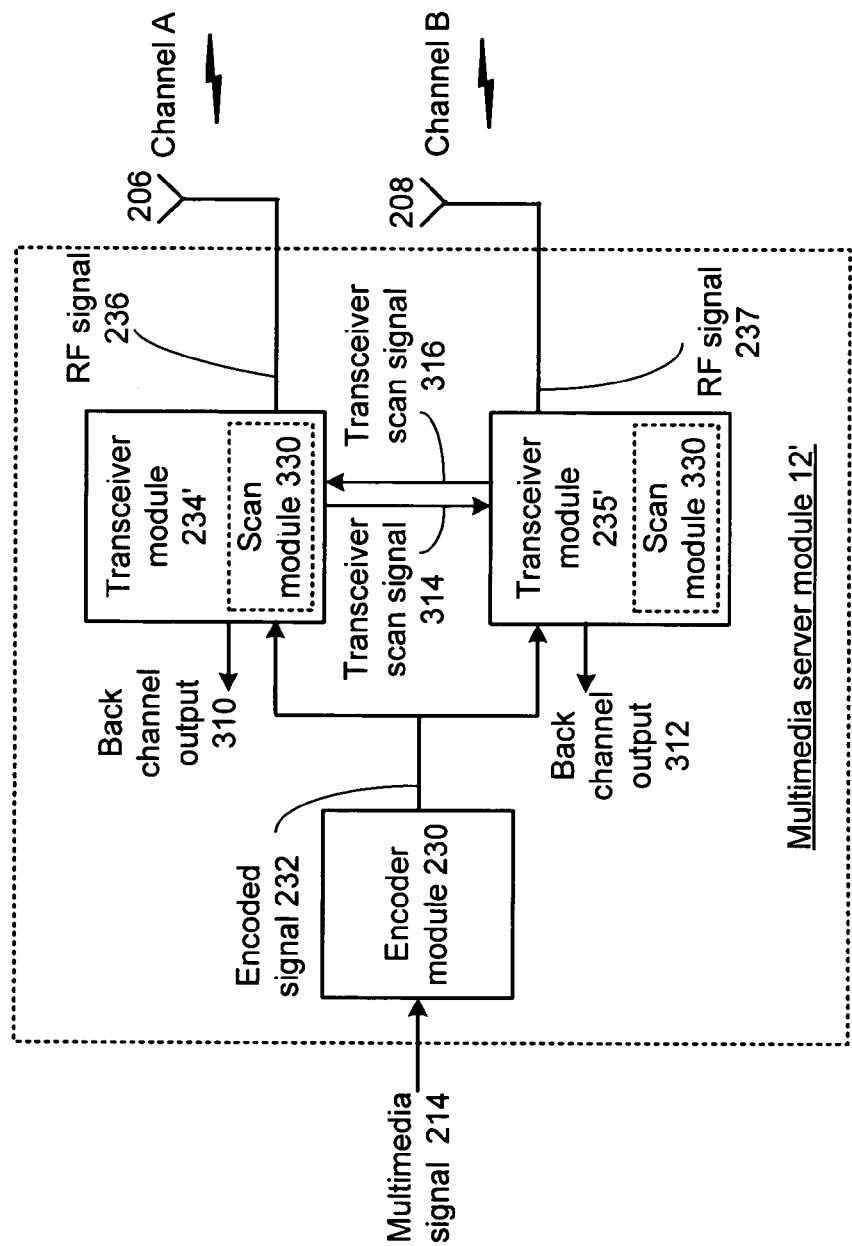
FIG. 9 presents a block diagram representation of a multimedia server module in accordance with an embodiment of the present invention.

FIG. 9 presents a block diagram representation of a multimedia server module in accordance with an embodiment of the present invention. Multimedia server module 12' includes many common elements of multimedia server module 12 described in conjunction with FIG. 4. Multimedia server module 12' includes transceiver modules 234' and 235' that each can operate in a transceive mode in a similar manner to transceiver module 234 and 235 to perform the functions and features attributed to multimedia server module 12. In addition, transceiver modules 234' and 235' can optionally operate over the same channel of a wireless broadband network (i.e. channel A and channel B are the same channel), without frequency diversity. However, transceiver modules 234' and 235' include a scan module 330 that allows one or the other transceiver to enter into a scan mode to assess different channels of one or more frequency bands, to identify an alternative channel, and to control the switching of one or both of the transceiver modules 234' and 235' to the alternative channel frequency.

In particular, transceiver modules 234' and 235', when in transceive mode, modulate encoded signal 232 to produce a RF signals 236 and 237 and transmit the RF signals 236 and 237 to a client module, such as client module 200 or client module 200' that will be described in further detail in conjunction with FIG. 10. If one of the transceiver modules, such as transceiver module 234' is in a scan mode, then this transceiver module performs a channel scan. In this case, back channel output 312 provides a baseband signal received from communication with the client module 200 or 200' as previously described in conjunction with back channel outputs 270. However, back channel output 310 is a baseband signal that is optionally used to assess the results of the channel scan.

In an embodiment of the present invention, only one of the transceiver modules can be in the scan mode at any given time. In particular, when the performance of the channel used by a particular transceiver module decreases below a threshold, a time period expires or some other condition is present, the transceiver module can enter a scan mode to scan the channel conditions of other available channels, either to find better channel conditions or perform a periodic channel survey. When the scan mode is entered, the full burden of sending and receiving data to and from the client module 200 or 200' falls to the other transceiver module.

When transceiver modules 234' end 235' enter the scan mode, each transceiver module asserts the corresponding transceiver scan signal 314 or 316. Before entering the scan mode, each transceiver module first checks to see that the other transceiver is not currently in the scanmode by determining if the transceiver scan signal of the other transceiver module is currently asserted. If the transceiver scan signal of the other transceiver module is deasserted, it is safe to enter into scan mode. If the transceiver scan signal of the other transceiver module is asserted, the transceiver module must remain in the transceive mode to continue to send and receive data from any client modules in the system.

In an embodiment of the present invention, the channel scan includes determining at least one performance parameter of an alternative transceiver channel, such as a bit error rate, signal to noise ratio, received signal strength indication, noise measurement, interference measurement, channel gain or other channel performance parameter. The scan module 330 is further operable to switch the transceiver module 234' and/or 235' to the transceive mode to transmit the corresponding RF signal 236 or 237 to the client module 200 or 200' over the alternative transceiver channel when the at least one performance parameter of the alternative transceiver channel compares favorably to a performance threshold. In this fashion, the transceiver modules 234' and 235' perform only an abbreviated channel scan that terminates when an acceptable channel is found. Alternatively, a more complete channel scan can be performed by determining a plurality of performance parameters for a plurality of alternative first transceiver channels. An alternative transceiver channel can be determined by determining the channel with the "best" characteristics based on one or more performance criteria.

When an alternative transceiver channel is identified, switch data is generated by the scan module and transmitted to the client modules 200 or 200' that are in communication with the multimedia server module 12' to request a change of channel from the original channel frequency to the frequency of the alternative transceiver channel. In an embodiment of the present invention, multimedia server module 12' receives a client module list of acceptable channels/channel frequencies from one or more client modules 200 or 200' and compares with its own locally generated multimedia server module list to determine if a common acceptable channel/channel frequency can be found. In an embodiment, the scan module is further operable to arbitrate the switch to the alternative transceiver channel with the client module. If one or more client modules in communication with multimedia server module 12' disagrees with the change of channels, arbitration mechanisms such as voting or other mechanisms can be employed to determine an acceptable alternative transceiver channel.

As previously discussed, transceiver modules 234' and 235' can operate from the same channel frequency. In this circumstance, when an alternative channel is determined, both transceivers modules switch to the alternative transceiver channel. In an alternative embodiment, transceivers 234' and 235' operate independently and can each perform channel scans and choose an appropriate channels to switch to, in conjunction with the corresponding transceiver modules of the client modules 200 or 200' in communication therewith.

Figure 10:
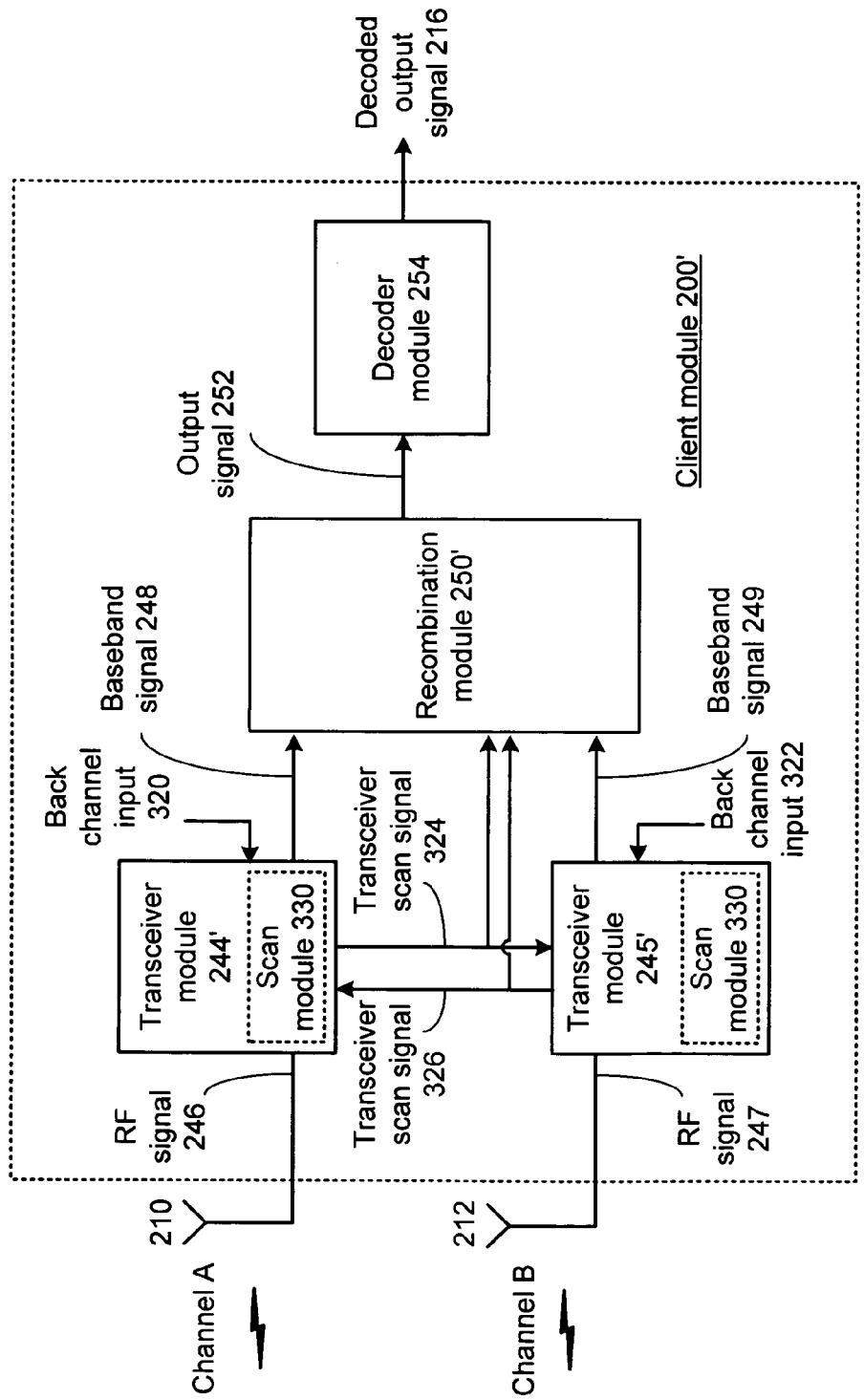
FIG. 10 presents a block diagram representation of a client module in accordance with an embodiment of the present invention.

FIG. 10 presents a block diagram representation of a client module in accordance with an embodiment of the present invention. Client module 200' includes many common elements of client module 200 described in conjunction with FIG. 5, however, that also includes transceiver modules 244' and 245' that operate in a similar, but reciprocal fashion, to transceiver modules 234' and 235' discussed in greater detail in conjunction with FIG. 9.

Transceiver modules 244' and 245' can optionally operate over the same channel of a wireless broadband network (i.e. channel A and channel B are the same channel), without frequency diversity. However, transceiver modules 244' and 245' include a scan module 330 that allows one or the other transceiver to enter into a scan mode to assess different channels of one or more frequency bands, to identify an alternative channel, and to control the switching of one or both of the transceiver modules 244' and 245' to the alternative channel frequency.

Transceiver modules 244' and 245, when in transceive mode, are operable to receive RF signals 246 and 247 from a multimedia server module, such as multimedia server module 12' over transceiver channels A and B and to convert the RF signal signals 246 and 247 into baseband signals 248 and 249. If one of the transceiver modules, such as transceiver module 244' is in a scan mode, then this transceiver module performs a channel scan. In this case, while back channel input 322 carries routine data for communication to multimedia server module 12' as previously described, back channel input 320 is used for communication with multimedia server module 12' regarding the command and control of functions relating to the channel scan, switching transceiver channels, etc.

In an embodiment of the present invention, only one of the transceiver modules 244' and 245' can be in the scan mode at any given time. In particular, when the performance of the channel used by a particular transceiver module decreases below a threshold, a time period expires or some other condition is present, the transceiver module can enter a scan mode to scan the channel conditions of other available channels, either to find better channel conditions or perform a periodic channel survey. When the scan mode is entered, the full burden of sending and receiving data to and from the multimedia server module 12 or 12' falls to the other transceiver module.

When transceiver modules 244' and 245' enter the scan mode, each transceiver module asserts the corresponding transceiver scan signal 324 or 326. Before entering the scan mode, each transceiver module first checks to see that the other transceiver is not currently in the transceive mode by determining if the transceiver scan signal of the other transceiver module is currently asserted. If the transceiver scan signal of the other transceiver module is deasserted, it is safe to enter into scan mode. If the transceiver scan signal of the other transceiver module is asserted, the transceiver module must remain in the transceive mode to continue to send and receive data from the multimedia server module 12 or 12'.

Client module 200' further includes recombination module 250' that is operably coupled to transceiver modules 244' and 245'. When the transceiver modules 244' and 245' are both in the transceive mode, as indicated by transceiver scan signals 324 and 326 not asserted, recombination module 250' operates as recombination module 250 to generate output signal 252 based on a combination of both baseband signals 248 and 249. However, if one of the transceiver modules 244' or 245' are in scan mode, as indicated by either transceiver scan signal 324 or 326 being asserted, output signal 252 is generated based on only the baseband signal from the transceiver module that remains in the transceive mode.

In an embodiment of the present invention, the channel scan includes determining at least one performance parameter of an alternative transceiver channel, such as a bit error rate, signal to noise ratio, received signal strength indication, noise measurement interference measurement, channel gain or other channel performance parameter. The scan module is further operable to switch the transceiver module 244' and/or 245' to the transceive mode to receive the corresponding RF signal 246 or 247 from the multimedia serve module 12 or 12' over the alternative transceiver channel when the at least one performance parameter of the alternative transceiver channel compares favorably to a performance threshold. In this fashion, the transceiver modules 244' and 245' perform only an abbreviated channel scan that terminates when an acceptable channel is found. Alternatively, a more complete channel scan can be performed by determining a plurality of performance parameters for a plurality of alternative first transceiver channels. An alternative transceiver channel can be determined by determining the channel with the "best" characteristics in based on one or more performance criteria.

When an alternative transceiver channel is identified, switch data is generated by the scan module and transmitted to the multimedia server module 12 or 12' to request a change of channel from the original channel frequency to the frequency of the alternative transceiver channel. In an embodiment, the scan module 330 is further operable to arbitrate the switch to the alternative transceiver channel with the multimedia server module 12 or 12', if the multimedia server module 12' disagrees with the change of channels. Arbitration mechanisms such as voting or other mechanisms can be employed to determine an acceptable alternative transceiver channel.

As previously discussed, transceiver modules 244' and 245' can operate from the same channel frequency. In this circumstance, when an alternative channel is determined, both transceivers modules switch to the alternative transceiver channel. In an alternative embodiment, transceivers 244' and 245' operate independently and can each perform channel scans and choose an appropriate channel to switch to, in conjunction with the corresponding transceiver modules of the client modules in communication therewith.

Figure 11:
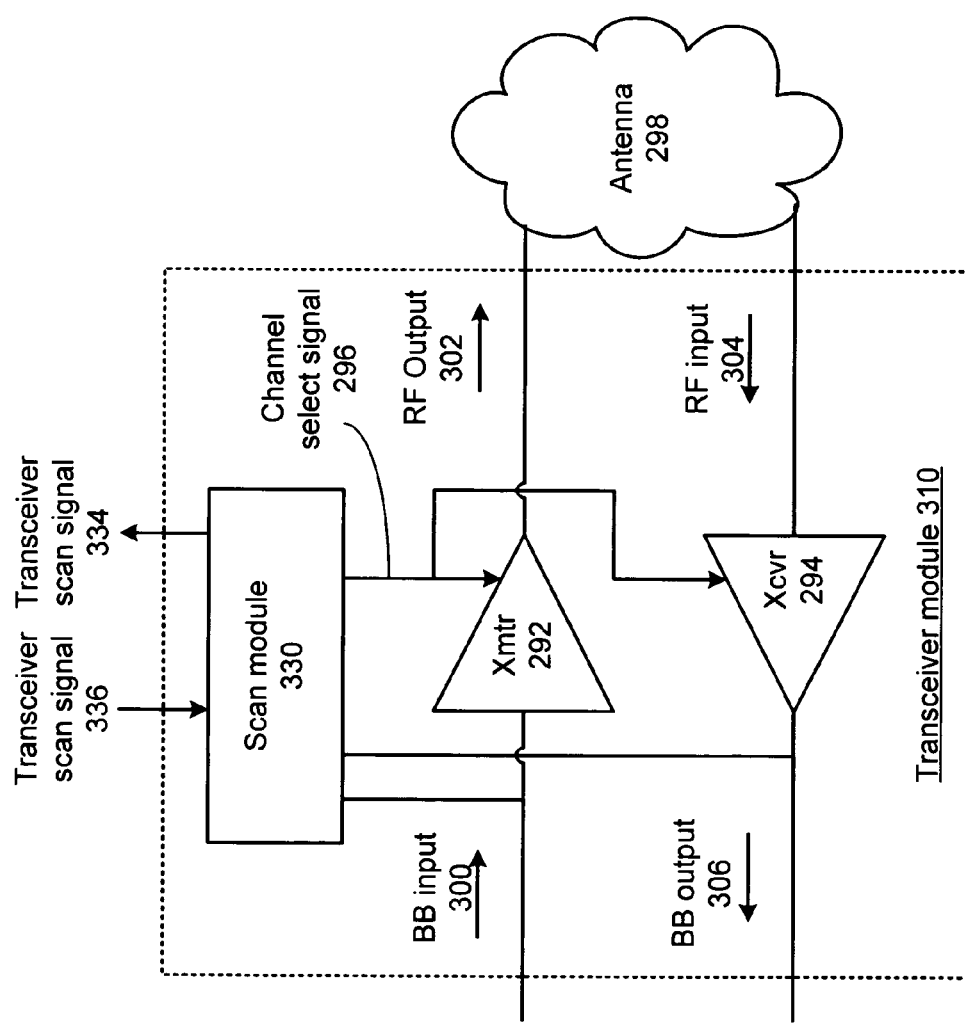
FIG. 11 presents a schematic block diagram representation of a transceiver module in accordance with an embodiment of the present invention.

FIG. 11 presents a schematic block diagram representation of a transceiver module in accordance with an embodiment of the present invention. Transceiver module 310 is shown that includes many of the elements of transceiver module 290 presented in conjunction with FIG. 6, and that can be used to implement transceiver modules 234', 235', 244' and/or 245' of FIGS. 9 and 10. Scan module 330 performs the functions attributed to the scan module of these other transceiver modules. Further, scan module 330 generates channel selection signal 296 to tune transmitter 292 and receiver 294 to the original transceiver channel or to one or more alternative channels. While in the scan mode, scan module 330 monitors the input to transmitter 292 and the output of receiver 294 to assess the performance parameters of the alternative transceiver channels and to control and arbitrate the switching of the channel frequencies with multimedia server module 12 or 12'.

Further, scan module 330 is operable to assert transceiver scan signal 334 of transceiver module 310 (corresponding to transceiver scan signals 314, 316, 324 and 326 of transceiver modules 234', 235', 244' and 245'). In addition, scan module 330 prevents transceiver module 310 from entering scan mode when transceiver scan signal 336, corresponding to a companion transceiver module, is asserted.

Figure 12:
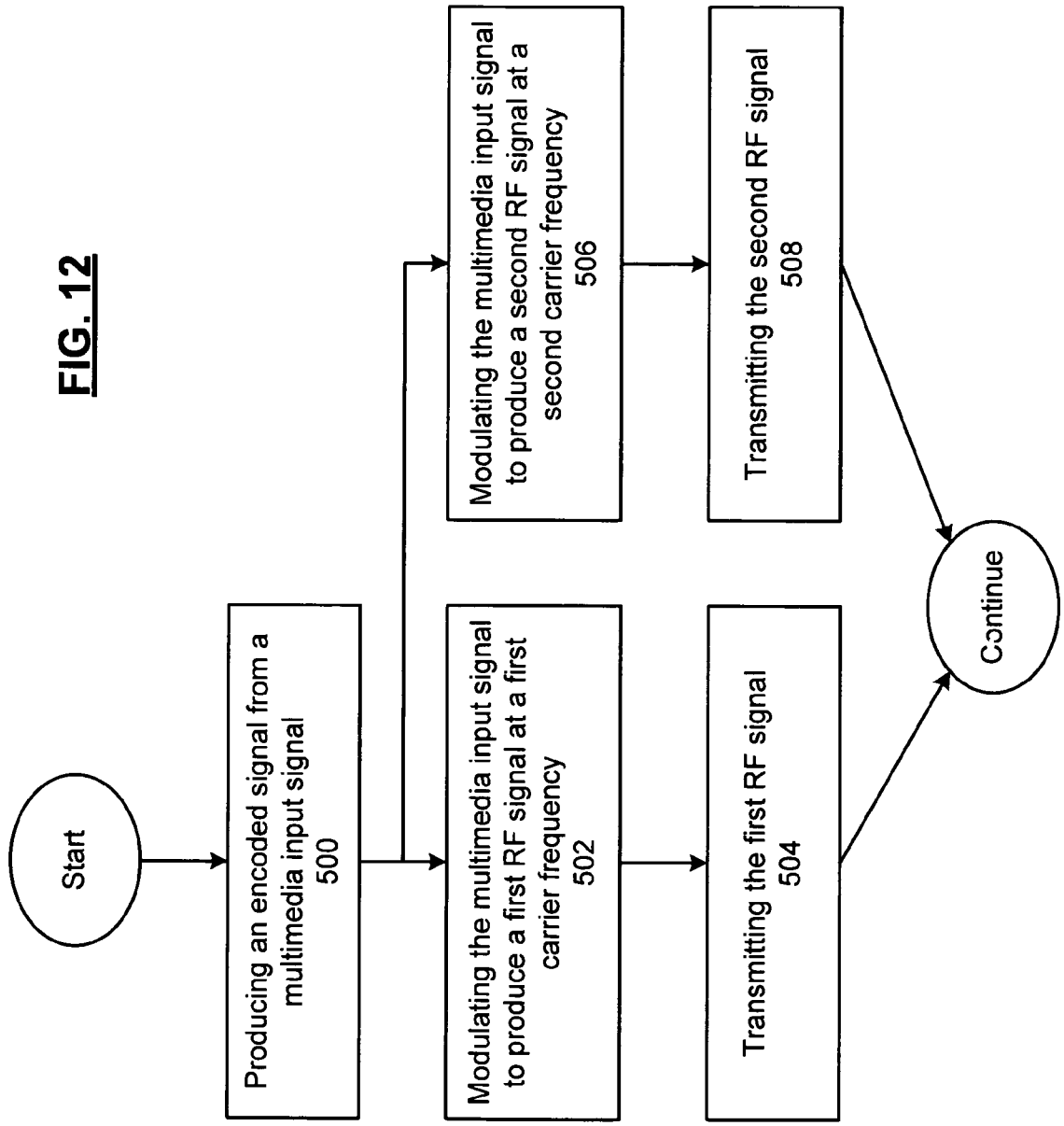
FIG. 12 presents a flow chart representation of a method in accordance with an embodiment of the present invention.

FIG. 12 presents a flow chart representation of a method in accordance with an embodiment of the present invention. In particular, a method is presented for use in conjunction with one or more of the functions and features described in association with FIGS. 1-11. In step 500, an encoded signal is produced from a multimedia input signal. In step 502, the multimedia input signal is modulated to produce a first radio frequency (RF) signal at a first carrier frequency. In step 504, the first RF signal is transmitted. In step 506, the multimedia input signal is modulated to produce a second RF signal at a second carrier frequency. In step 508, the second RF signal is transmitted.

In an embodiment of the present invention, the first RF signal and the second RF signal are carried over separate channels of a broadband wireless access network, wherein the broadband wireless access network conforms to at least one of the following standards: 802.11x, Ultra Wideband (UWB), and Worldwide Interoperability for Microwave Access (WiMAX). In an embodiment, the first carrier frequency and the second carrier frequency fall within separate frequency bands. Further, the multimedia input signal may include a composite video signal. In addition, the encoded video signal includes at least one of: a transrate compressed signal, and a transcode compressed signal. In an embodiment of the present invention, the baseband signals may be low IF signals.

Figure 13:
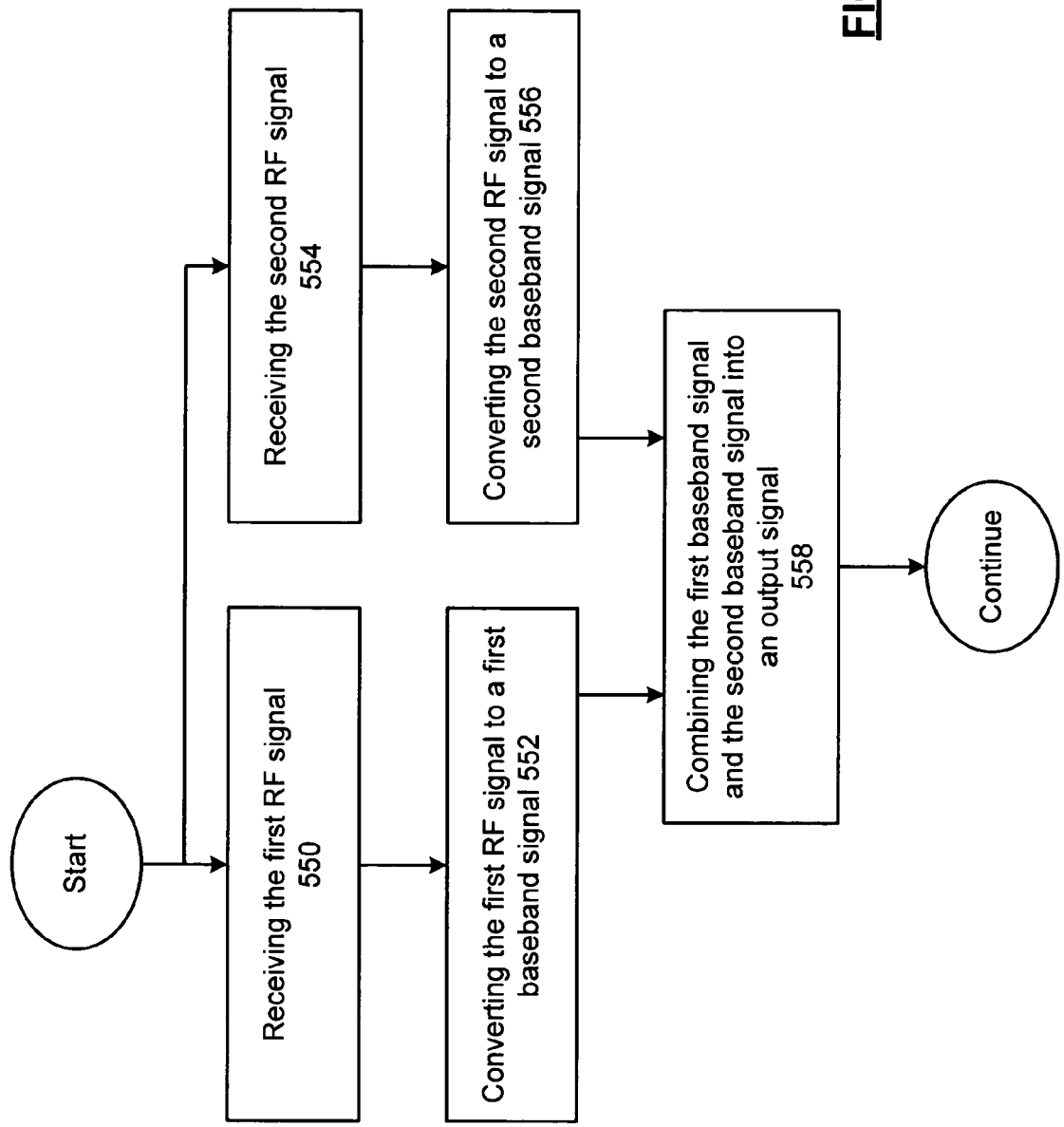
FIG. 13 presents a flow chart representation of a method in accordance with an embodiment of the present invention.

FIG. 13 presents a flow chart representation of a method in accordance with an embodiment of the present invention. In particular, a method is presented for use in conjunction with one or more of the functions and features described in association with FIGS. 1-12. In step 550, a first RF signal is received. In step 552, the first RF signal is converted into a first baseband signal. In step 554, a second RF is received. In step 556, the second RF signal is converted into a second baseband signal. In step 558, the first baseband signal and the second baseband signal are combined into an output signal. In an embodiment of the present invention, step 558 includes combining the first baseband signal and the second baseband signal using a maximum ratio recombination.

Figure 14:
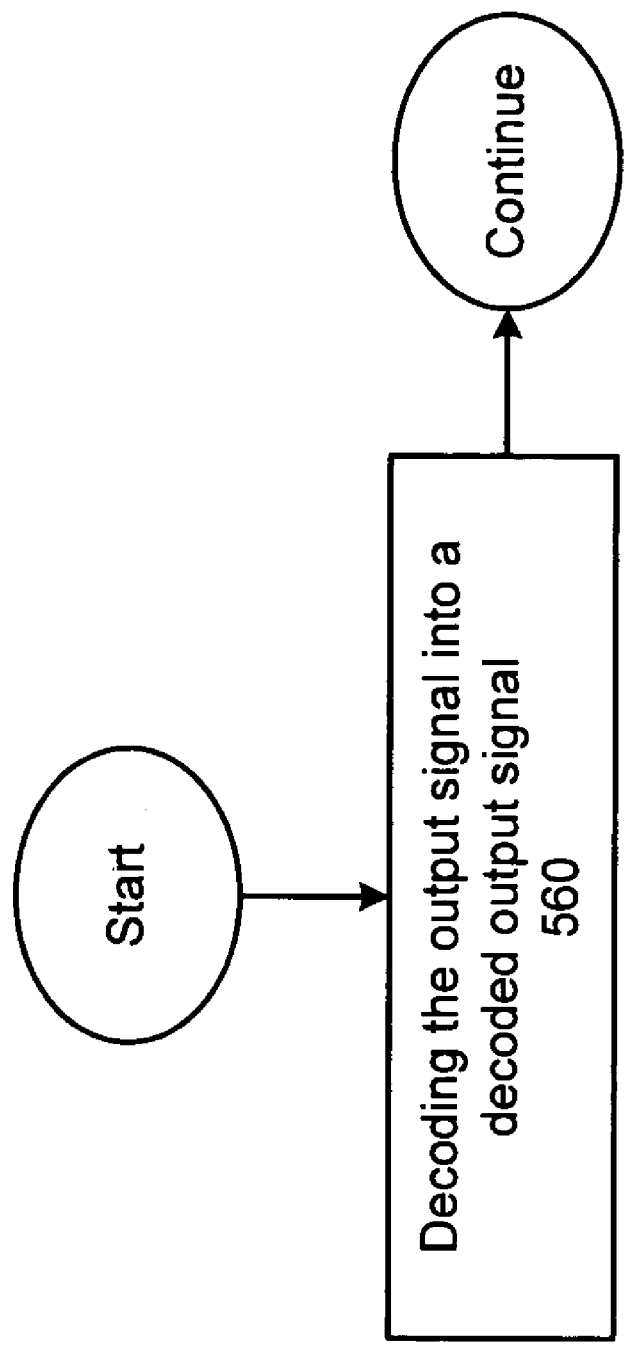
FIG. 14 presents a flow chart representation of a method in accordance with an embodiment of the present invention.

FIG. 14 presents a flow chart representation of a method in accordance with an embodiment of the present invention. In particular, a method is presented for use in conjunction with one or more of the functions and features described in association with FIG. 13. In step 560, the output signal is decoded into a decoded output signal.

Figure 15:
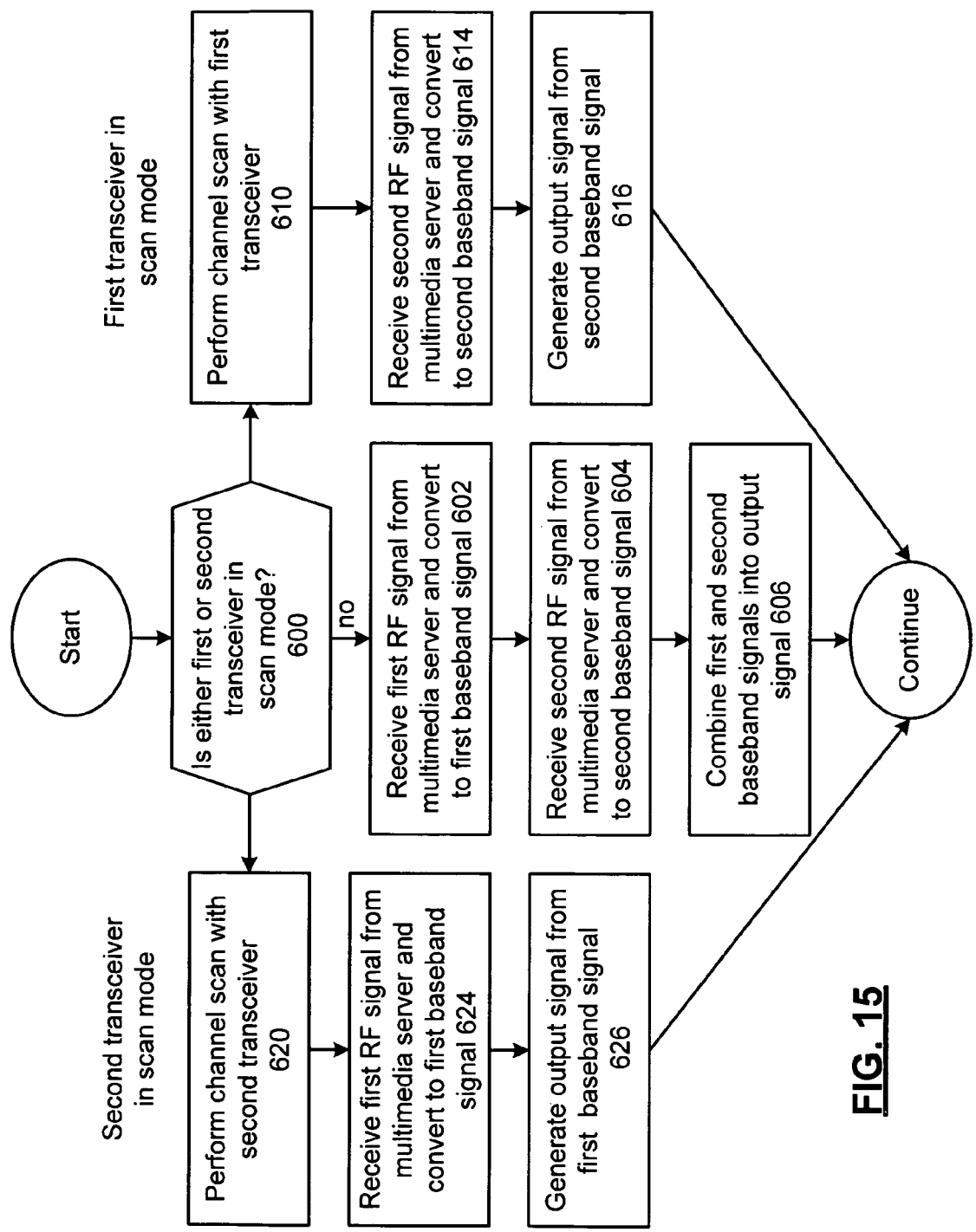
FIG. 15 presents a flow chart representation of a method in accordance with an embodiment of the present invention.

FIG. 15 presents a flow chart representation of a method in accordance with an embodiment of the present invention. In particular, a method is presented for use in conjunction with one or more of the features and functions presented in association with FIGS. 1-14. In step 600, the method determines if either the first or second transceiver is in the scan mode. If not, a first radio frequency (RF) signal is received from a multimedia server module over a first transceiver channel and converted into a first baseband signal as shown in step 602, and a second RF signal is received from a multimedia server module over a second transceiver channel and converted into a second baseband signal as shown in step 604. In step 606, the first baseband signal and the second baseband signal are combined into an output signal.

If the first transceiver is in the scan mode, a channel scan is performed with the first transceiver as shown in step 610. The second RF signal is received from a multimedia server module over a second transceiver channel and converted into a second baseband signal as shown in step 614. In step 616, the output signal is generated from the second baseband signal.

If the second transceiver is in the scan mode, a channel scan is performed with the second transceiver as shown in step 620. The first RF signal is received from a multimedia server module over a first transceiver channel and converted into a first baseband signal as shown in step 624. In step 626, the output signal is generated from the first baseband signal.

In an embodiment of the present invention, steps 610 and 620 include determining a plurality of performance parameters for a plurality of alternative first transceiver carriers. The first transceiver channel and the second transceiver channel can be the same channel or different channels, of a broadband wireless access network that conforms to at least one of the following standards: 802.11, Ultra Wideband (UWB), and Worldwide Interoperability for Microwave Access (WiMAX).

Figure 16:
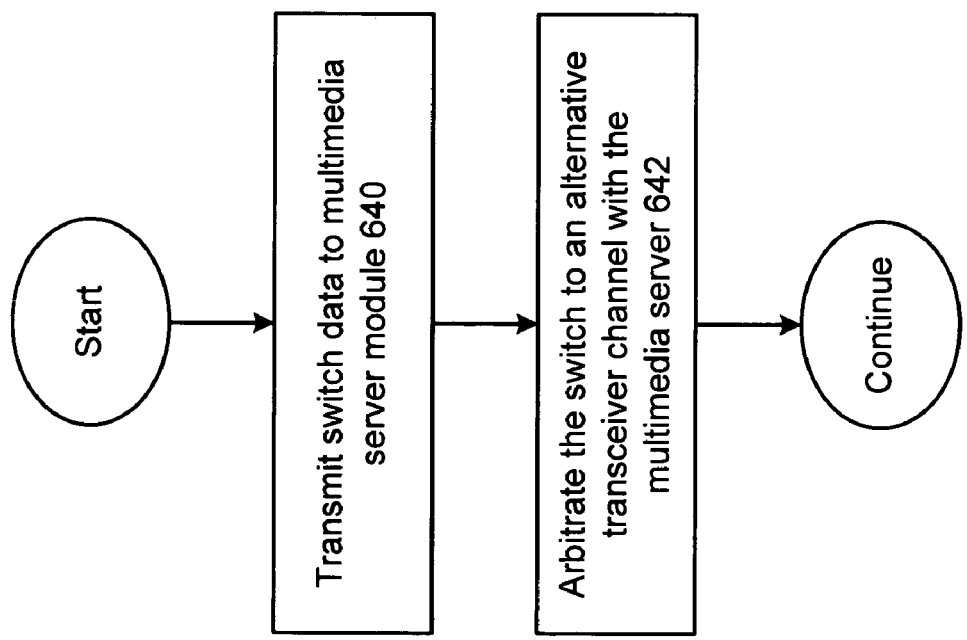
FIG. 16 presents a flow chart representation of a method in accordance with an embodiment of the present invention.

FIG. 16 presents a flow chart representation of a method in accordance with an embodiment of the present invention. In particular, a method is presented for use in conjunction with one or more of the features and functions presented in association with FIGS. 1-15. In step 640, switch data is transmitted to a multimedia server module. In step 642, the switch to the alternative first transceiver channel is arbitrated between a client module and the multimedia server module.

Figure 17:
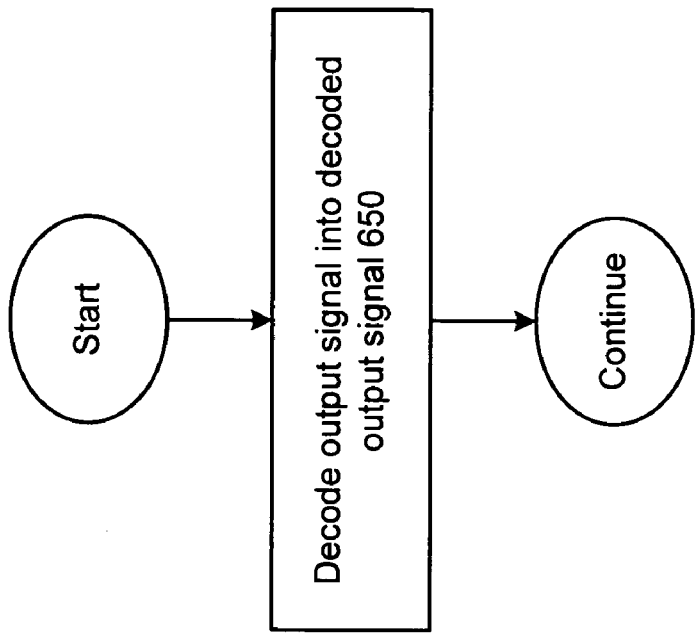
FIG. 17 presents a flow chart representation of a method in accordance with an embodiment of the present invention.

FIG. 17 presents a flow chart representation of a method in accordance with an embodiment of the present invention. In particular, a method is presented for use in conjunction with one or more of the features and functions presented in association with FIGS. 1-16. In step 650, the output signal is decoded into a decoded output signal.

Figure 18:
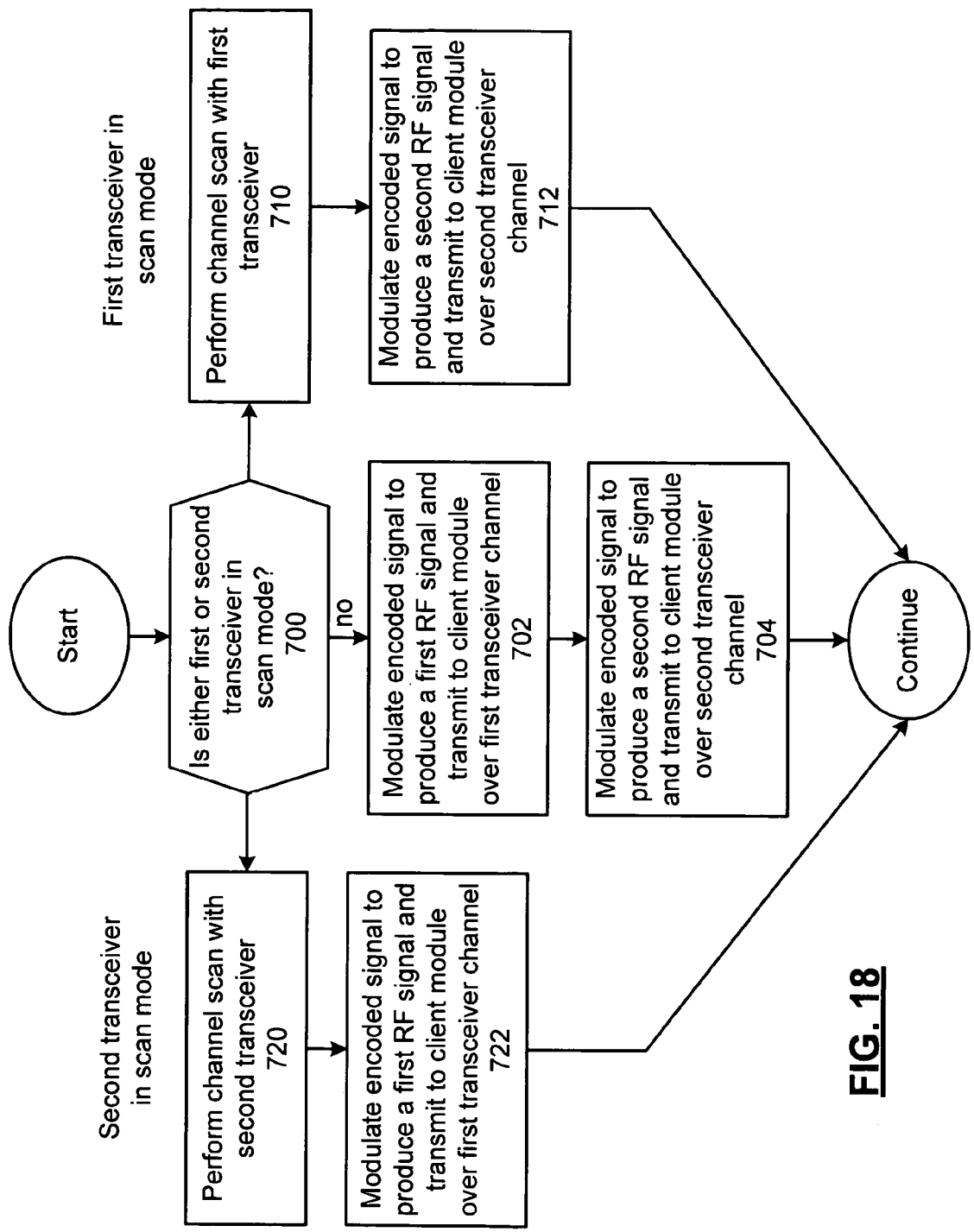
FIG. 18 presents a flow chart representation of a method in accordance with an embodiment of the present invention.

FIG. 18 presents a flow chart representation of a method in accordance with an embodiment of the present invention. In particular, a method is presented for use in conjunction with one or more of the features and functions presented in association with FIGS. 1-17. In step 700, the method determines if either the first or second transceiver is in the scan mode. If not, an encoded signal is modulated to produce a first RF signal and transmitted to a client module over a first transceiver channel as shown in step 702; and the encoded signal is modulated to produce a second RF signal and transmitted to a client module over a second transceiver channel as shown in step 704.

If the first transceiver is in scan mode, a channel scan is performed with the first transceiver as shown in step 710 and the encoded signal is modulated to produce a second RF signal and transmitted to a client module over a second transceiver channel as shown in step 712. If the second transceiver is in scan mode, a channel scan is performed with the second transceiver as shown in step 720 and the encoded signal is modulated to produce a first RF signal and transmitted to a client module over a first transceiver channel as shown in step 722.

In an embodiment of the present invention, steps 710 and 720 include determining a plurality of performance parameters for a plurality of alternative first transceiver channels. The first transceiver channel and the second transceiver channel can be the same channel or different channels, of a broadband wireless access network that conforms to at least one of the following standards: 802.11x, Ultra Wideband (UWB), and Worldwide Interoperability for Microwave Access (WiMAX). Further, the encoded signal may include a composite video signal. Also, the first transceiver module is operably coupled to a first antenna and the second transceiver module is coupled to a second antenna that is spatially diverse from the first antenna.

Figure 19:
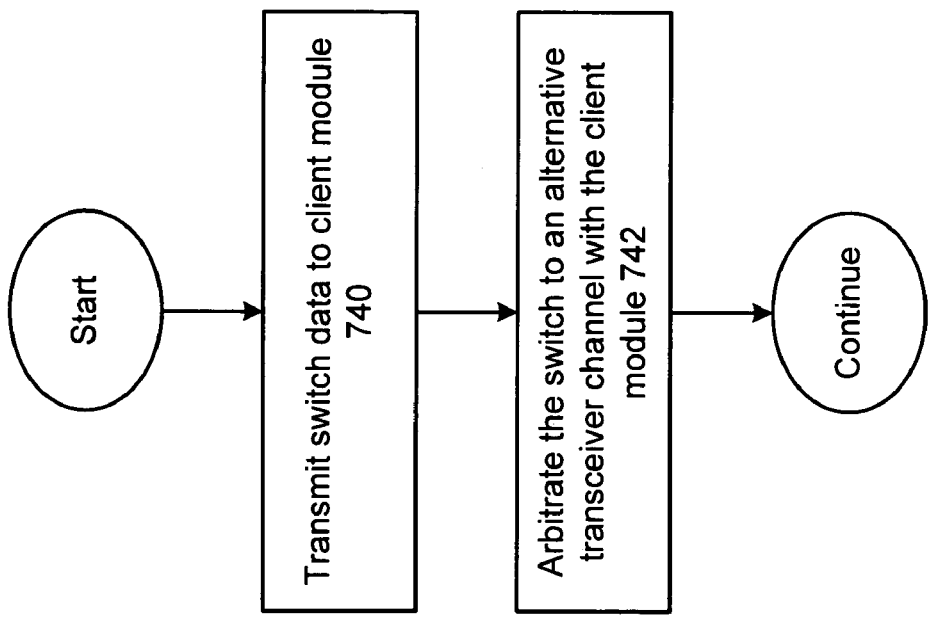
FIG. 19 presents a flow chart representation of a method in accordance with an embodiment of the present invention.

FIG. 19 presents a flow chart representation of a method in accordance with an embodiment of the present invention. In particular, a method is presented for use in conjunction with one or more of the features and functions presented in association with FIGS. 1-18. In step 740, switch data is transmitted to the client module. In step 742, the switch to the alternative first transceiver channel is arbitrated between a multimedia server module and the client module. In an embodiment, step 742 includes receiving a client module list of possible alternative first transceiver channels from the client module, and comparing the client module list with a multimedia server module list.

Figure 20:
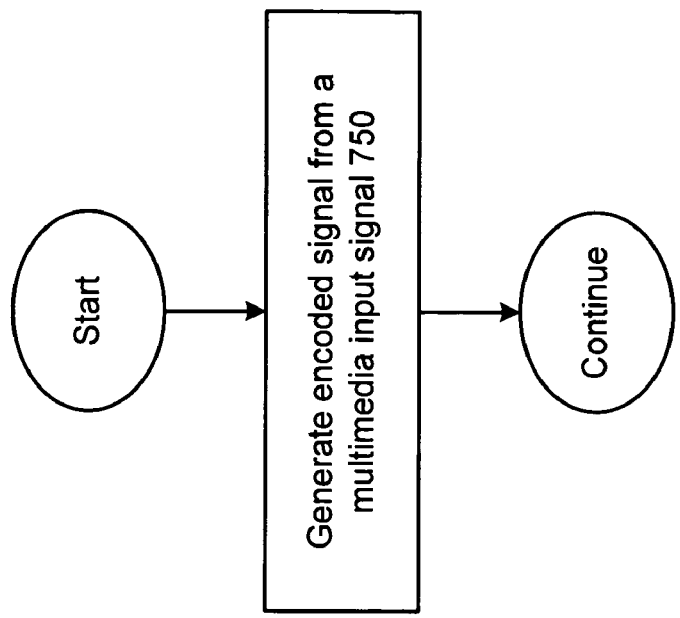
FIG. 20 presents a flow chart representation of a method in accordance with an embodiment of the present invention.

FIG. 20 presents a flow chart representation of a method in accordance with an embodiment of the present invention. In particular, a method is presented for use in conjunction with one or more of the features and functions presented in association with FIGS. 1-19. In step 750, an encoded signal is generated from a multimedia input signal.

Figure 21:
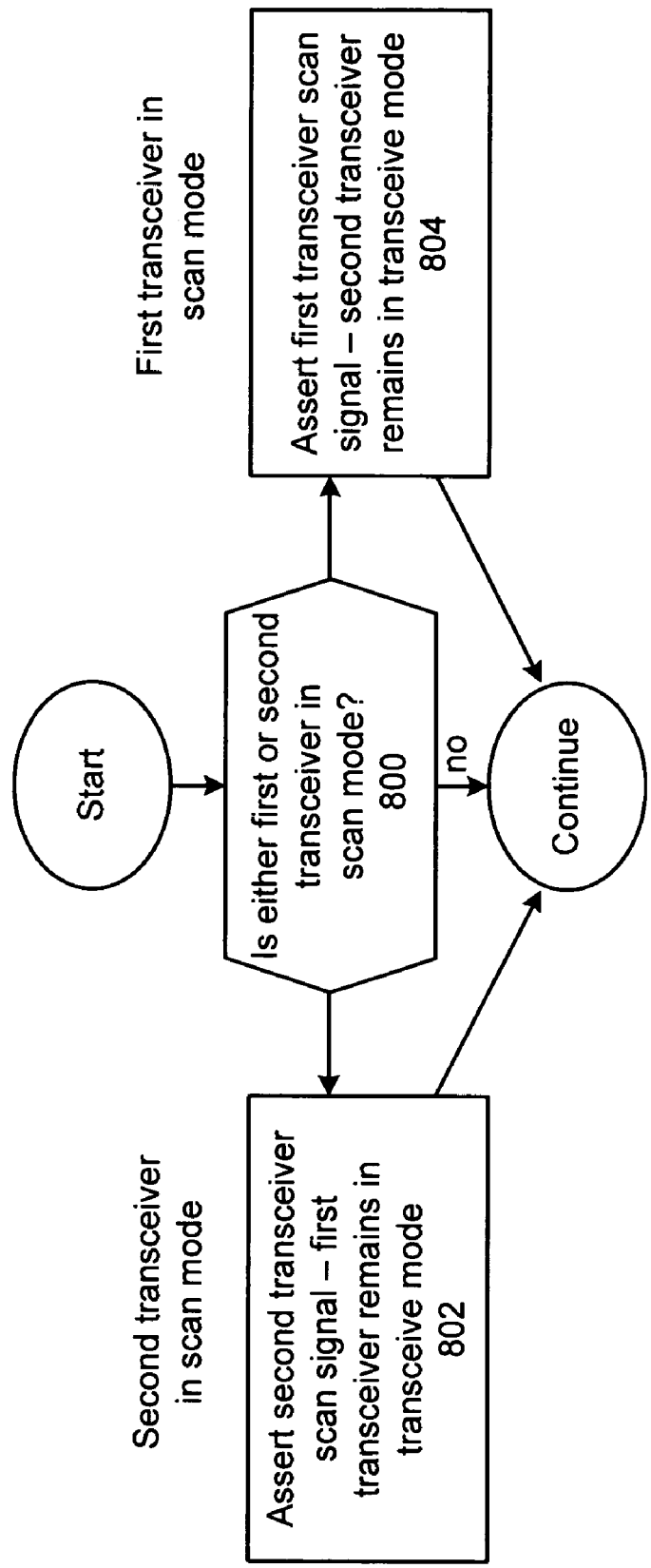
FIG. 21 presents a flow chart representation of a method in accordance with an embodiment of the present invention.

FIG. 21 presents a flow chart representation of a method in accordance with an embodiment of the present invention. In particular, a method is presented for use in conjunction with one or more of the features and functions presented in association with FIGS. 1-20. In step 800, the method determines if either the first or second transceiver is in the scan mode. In step 804, a first transceiver scan signal is asserted when the first transceiver is in the scan mode, and the second transceiver module remains in the transceive mode. In step 802, a second transceiver scan signal is asserted when the second transceiver is in the scan mode, and the first transceiver module remains in the transceive mode.

Figure 22:
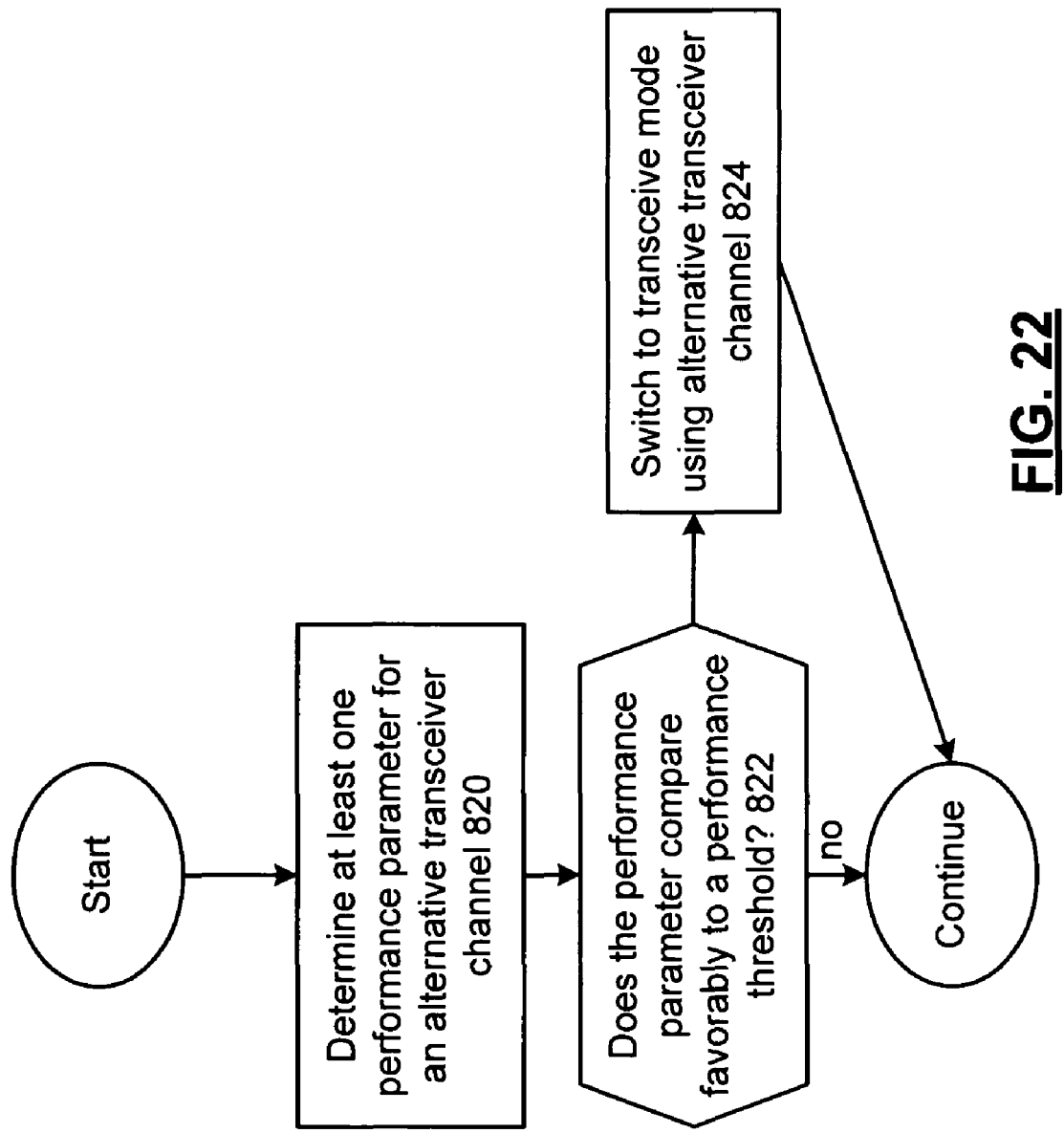
FIG. 22 presents a flow chart representation of a method in accordance with an embodiment of the present invention.

FIG. 22 presents a flow chart representation of a method in accordance with an embodiment of the present invention. In particular, a method is presented for use in conjunction with one or more of the features and functions presented in association with FIGS. 1-21. In step 820, the method determines at least one performance parameter for an alternative first transceiver channel. In step 822, the method determines if at least one performance parameter of the alternative first transceiver channel compares favorably to a performance threshold. If so, a switch is made to the transceive mode using the alternative first transceiver channel as shown in step 824.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module and radio receiver. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A client module comprising:
    a first transceiver module for receiving a first radio frequency (RF) signal from a multimedia server module over a first transceiver channel and for converting the first RF signal into a first baseband signal when the first transceiver module is in a transceiver mode, the first transceiver module including a first scan module for performing a channel scan of unused channels to determine an alternative first transceiver channel with acceptable interference characteristics, when the first transceiver module is in a scan mode;
    a second transceiver module for receiving a second RF signal from a multimedia server module over a second transceiver channel and for converting the second RF signal into a second baseband signal when the second transceiver module is in a transceiver mode; and
    a combination module, operably coupled to the first transceiver module and the second transceiver module, for combining the first baseband signal and the second baseband signal into an output signal when the first transceiver and the second transceiver are both in the transceive mode and for generating the output signal from the second baseband signal when the first transceiver is in the scan mode.

2. The client module of claim 1 wherein the second transceiver module further includes a second scan module for performing a channel scan to determine an alternative second transceiver channel with acceptable interference characteristics, when the second transceiver module is in a scan mode.

3. The client module of claim 2 wherein the first scan module is operably coupled to the second scan module, and wherein the first scan module asserts a first transceiver scan signal when the first transceiver is in the scan mode and wherein the second transceiver module remains in the transceive mode when the first transceiver scan signal is asserted.

4. The client module of claim 1 wherein the channel scan includes a determining a plurality of performance parameters of the an alternative first transceiver channel.

5. The client module of claim 4 wherein the first scan module is further operable to switch the first transceiver module to the transceive mode to receive the first radio frequency (RF) signal from a multimedia server module over the alternative first transceiver channel, when a plurality of performance parameters of the alternative first transceiver channel compares favorably to a performance threshold.

6. The client module of claim 5 wherein the first transceiver module is further operable to transmit switch data from the first scan module to the multimedia server module.

7. The client module of claim 6 wherein the first scan module is further operable to arbitrate the switch to the alternative first transceiver channel with the multimedia server module.

8. The client module of claim 1 wherein the channel scan includes determining a plurality of performance parameters for a plurality of alternative first transceiver channels.

9. The client module of claim 1 wherein the first transceiver channel and the second transceiver channel are the same channel of a broadband wireless access network.

10. The client module of claim 1 wherein the first transceiver channel and the second transceiver channel are different channels of a broadband wireless access network.

11. The client module of claim 10 wherein the broadband wireless access network conforms to at least one of the following standards: 802.11x, Ultra Wideband (UWB), and Worldwide Interoperability for Microwave Access (WiMAX).

12. The client module of claim 1 further comprising: a decoder module, operably coupled to the recombination module, for decoding the output signal into a decoded output signal.

13. The client module of claim 12 wherein the decoded output signal includes a composite video signal.

14. The client module of claim 1 wherein the first transceiver module is operably coupled to a first antenna and the second transceiver module is coupled to a second antenna that is spatially diverse from the first antenna.

15. The client module of claim 1 wherein one of: the first baseband signal and the second baseband signal, includes a low IF signal.

16. A method comprising:
    receiving a first radio frequency (RF) signal from a multimedia server module over a first transceiver channel and converting the first RF signal into a first baseband signal when a first transceiver module is in a transceive mode;
    performing a channel scan when the first transceiver module is in a scan mode of unused channels to determine an alternative first transceiver channel with acceptable interference characteristics for the first transceiver module to automatically switch to;
    receiving a second RF signal from a multimedia server module over a second transceiver channel and converting the second RF signal into a second baseband signal when a second transceiver is in a transceive mode;
    combining the first baseband signal and the second baseband signal into an output signal when the first transceiver and the second transceiver are both in the transceive mode; and
    generating the output signal from the second baseband signal when the first transceiver is in the scan mode.

17. The method of claim 16 further comprising:
    performing a channel scan when the second transceiver module is in a scan mode to determine an alternative second transceiver channel with acceptable interference characteristics.

18. The method of claim 17 further comprising:
    asserting a first transceiver scan signal when the first transceiver is in the scan mode;
    wherein the second transceiver module remains in the transceive mode when the first transceiver scan signal is asserted.

19. The method of claim 17 wherein the step of performing a channel scan includes a determining a plurality of performance parameters of the alternative first transceiver channel.

20. The method of claim 19 further comprising:
switching to the transceive mode using the alternative first transceiver channel when a plurality of performance parameters of the alternative first transceiver channel compares favorably to a performance threshold.

21. The method of claim 20 further comprising:
transmitting switch data to the multimedia server module.

22. The method of claim 21 further comprising:
arbitrating the switch to the alternative first transceiver channel with the multimedia server module.

23. The method of claim 16 wherein the step of performing a channel scan includes determining a plurality of performance parameters for a plurality of alternative first transceiver channels.

24. The method of claim 16 wherein the first transceiver channel and the second transceiver channel are the same channel of a broadband wireless access network.

25. The method of claim 16 wherein the first transceiver channel and the second transceiver channel are different channels of a broadband wireless access network.

26. The method of claim 25 wherein the broadband wireless access network conforms to at least one of the following standards: 802.11x, Ultra Wideband (UWB), and Worldwide Interoperability for Microwave Access (WiMAX).

27. The method of claim 16 further comprising:
decoding the output signal into a decoded output signal.

28. The method of claim 27 wherein the decoded output signal includes a composite video signal.

29. The method of claim 16 wherein one of: the first baseband signal and the second baseband signal, includes a low IF signal.

* * * * *